United States Patent Office 3,142,480
Patented July 28, 1964

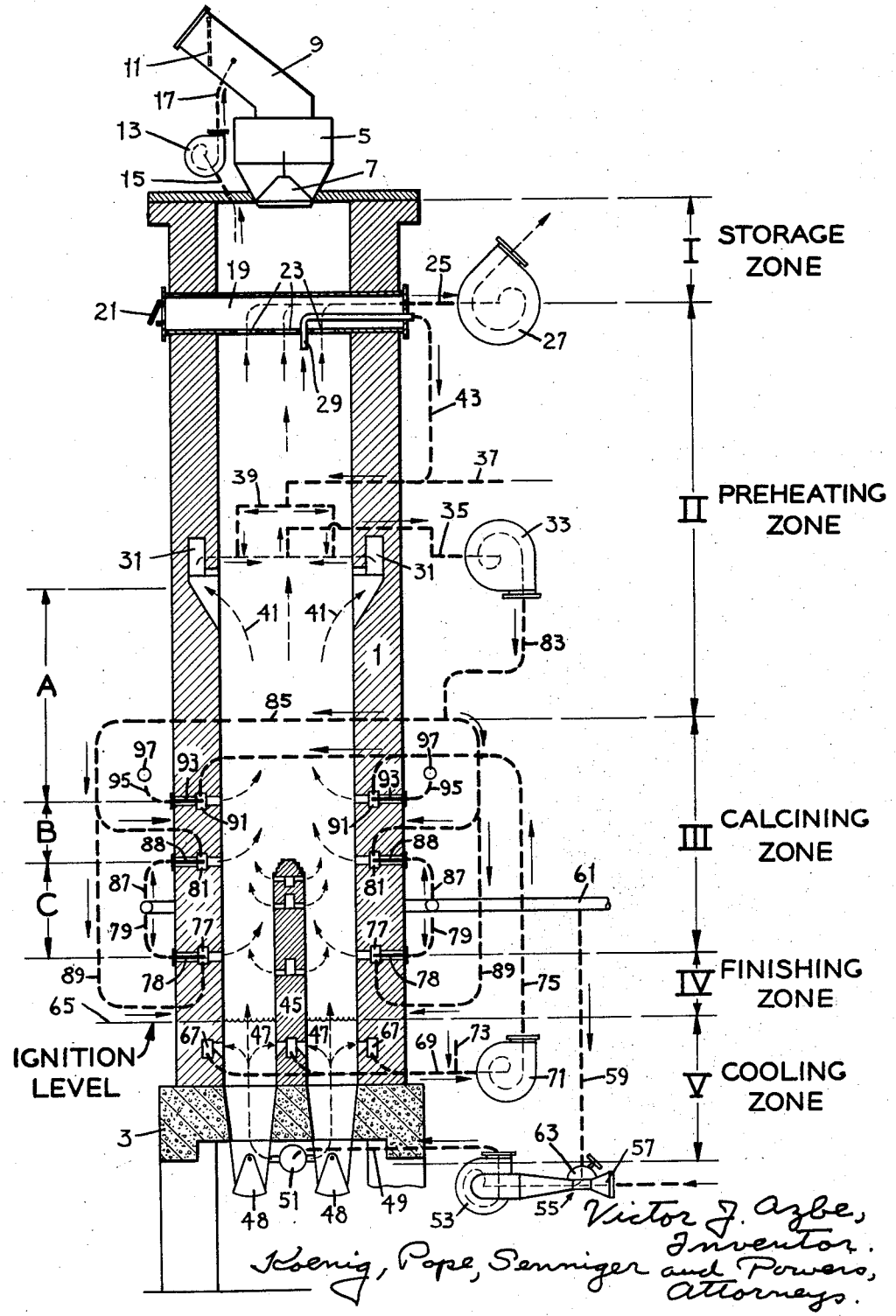

3,142,480
CALCINING APPARATUS
Victor J. Azbe, Webster Groves, Mo., assignor to Azbe Corporation, Clayton, Mo., a corporation of Missouri
Filed June 8, 1961, Ser. No. 115,630
6 Claims. (Cl. 263—29)

This invention relates to calcining apparatus, and with regard to certain more specific features, to gas-fired vertical kilns for burning limestone and the like.

Among the several objects of the invention may be noted the provision of improved calcining apparatus in the form of a gas-fired vertical-shaft type of kiln in which improved temperature-modulated combustion is obtained, thereby minimizing rapid kiln deterioration, and producing improved calcined products; and the provision of calcining apparatus of this class adapted to increase kiln production rates with improved fuel economy. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawing, the single figure is a diagrammatic vertical section of a kiln employing the invention, wherein certain gas and air pipe passages are illustrated by heavy broken lines, the lighter broken lines illustrating other connected gas and air passages.

Briefly, the present invention comprises a vertical gas-fired kiln shaft, provided at its lower end with means for introducing a lean mixture of gas and ambient cool air for establishing a cooling zone, in which cooling zone heat is recuperatively abstracted from the finished cooling material. Ignition or firing of the mixture, because of its controlled leanness, is delayed until the mixture has been sufficiently heated by passing through the cooling zone. The ignition occurs at a level which establishes a limited-temperature finishing zone above the cooling zone.

Fuel gas is admitted in excess at an elevation in the shaft above the finishing zone, which results in a rich fuel-air mixture which also burns at a limited temperature to establish above the finishing zone a lower terminal calcining section in a sectionalized calcining zone. In this lower terminal calcining section the temperature is again limited. This prevents overburning of calcined material, which in this section exists in substantial quantity.

Above said terminal calcining section is an intermediate section of the calcining zone which is established by introduction of sufficient air to burn a substantial part of the fuel gas, thereby obtaining a high temperature for the main calcining process.

Above this high-temperature intermediate calcining section is established a combustion termination zone by the introduction at a higher elevation of additional air. This air completes combustion and establishes an upper precalcining section in the calcining zone.

Above the three-section calcining zone are located a preheating zone, a storage zone and an exhaust-pressurizing charging system.

The term lean as used herein in connection with a combustible mixture of air and gas means one in which the air in the mixture is in an amount in substantial excess of the stoichiometric amount required for complete burning of the fuel gas so as to control the burning temperature to prevent overheating. The term rich as used herein in connection with a combustible mixture of air and gas means one in which the air in the mixture is in an amount which is less than the stoichiometric amount required for substantially complete combustion of the fuel gas, so as also to control the burning temperature to prevent overheating.

Referring now more particularly to the drawing, there is shown at numeral 1 a hollow vertical kiln shaft composed of suitable refractory materials, supported upon a base 3. At the upper end of the shaft 1 is located a charging bunker 5 having an openable and closable outlet bell 7 for delivery, as needed, of crushed stone to the upper end of the shaft.

At numeral 9 is shown a sloping chute extending from a rock supply (not shown) to the bunker 5. In the chute 9 is a suspended trap-forming pivoted gate 11, which opens to admit a charge down the inlet chute 9 and recloses thereafter. At numeral 13 is shown a fan having an inlet connection 15 in the upper portion of the shaft 1 and an outlet connection 17 with the chute 9 below the gate 11. By means of this fan 13, warm spent gases may be abstracted from the upper end of the kiln when filled with rock. The abstracted spent gas is then employed for pressurizing the charging system.

The purpose of pressurizing the charging system 5, 7, 9, 11 is to prevent infiltration of air into the shaft 1 during charging operations. Thus when the gate 11 is opened to admit material into the chute 9, there will be an outflow of spent gases through it, rather than inward leakage of air. Consequently, when the bell 7 is opened, air will not be drawn into the shaft 1. Moreover, when the bell 7 is opened, there will be an outflow of spent gases around it, without the possibility of inducing any air flow into the shaft 1. Incidental inleakage of air will also be positively prevented. This feature is desirable since any air inleakage at this point would change the temperature and composition of spent gases and interfere with any automatic control means which may be employed.

At a distance below the upper end of the shaft 1 is located across pipe 19, at one end of which is an adjustable cool air inlet 21. The pipe 19 has ports 23 within shaft 1 for receiving spent warm gases from the interior of the shaft 1. The other end of the pipe 19 has an outlet connection 25 with an exhaust fan 27, whereby gas from the inside of the shaft 1 may be abstracted through the ports 23 and pipe 19. Pipe 19 determines a storage zone I above a preheating zone II. A pipe connection 29, passing through pipe 19 between the interior and exterior of the shaft 1, permits the abstraction of an additional flow of spent gas for purposes to be described. The pipe 29 and use of this additional flow are optional.

At a lower elevation in the shaft 1, below pipe 19, is located a peripheral offtake channel 31 for reception of spent gases. This channel 31 is connected with a recirculation fan 33 (see connection 35). A cool air inlet connection 37, having a branched connection 39 with the peripheral channel 31, supplies cool air to the very hot spent gases 41 received from the shaft 1 to cool to the upper temperature limit of fan 33. At 43 is shown a connection between the pipe 29 and the cool air inlet 37. As above indicated, the pipe 29 is optional and so also is this connection 43.

There are also established in descending order a calcining zone III, a finishing zone IV and a cooling zone V. At A is shown a combustion terminating section which laps the lower end of the preheating zone II and the upper end of the calcining zone III. Within the calcining zone III are the lower end of section A and sections B and C. If desired, and as shown, a central firing wall construction 45 may be provided in the lower end of the shaft 1, which divides it into separate passages 47, the latter extending from approximately the bottom of the cooling zone V and up through section C of the calcining zone. This type of wall is optional, being more desirable in kilns of larger diameters. Since the firing wall is optional, so are the gas and air ports therein, which are described below. The passages 47 are extended through the supporting platform 3.

At the lower ends of the passages 47 are located draw works 48, which are opened from time to time to withdraw finished material and to effect descent of unfinished material through the shaft 1.

The cooling zone V is established as follows: Connected with the lower ends of the shaft sections 47 is a first primary air inlet means 49 (see the connections 51). A primary air fan is shown at 53, which receives cool ambient air from a conventional gas and air proportioning device shown generally at numeral 55. This device 55 has an air inlet 57 and a fuel gas inlet 59, the latter extending from a fuel gas supply line 61. At numeral 63 is indicated a conventional air-gas-ratio flow control device, which may be one of several known in the art, and requiring no further description, except to state that it is adjustable to maintain any desired ratio of air to gas in the fluid stream generated by the fan 53, at any flow rate. According to the present invention, the device 63 is set to provide a comparatively lean combustible air-gas mixture for delivery to the cooling zone over the inlet connection 49. As this lean mixture rises through the cooling zone in sections 47, its temperature is increased to its ignition temperature, which occurs at the ignition level indicated at 65. Ignition is delayed relative to the time that it would occur if the mixer were richer, say in stoichiometrical proportions. Moreover, the lean mixture after ignition maintains a lower temperature than would otherwise be generated, which minimizes damage to the calcined product in the finishing zone IV.

In the case of lime production, ignition may occur at 1,600° F., for example but without limitation, at level 65. The ignition level 65 determines the lower end of the finishing zone IV in which, due to the cooling effect of the excess air, the limited temperature is maintained and which avoids overburning of the finished product in this zone IV.

Not all of the lean mixture is permitted to enter the finishing zone IV, a substantial amount being drawn off through suitable first lower outlet ports 67 by a connection 69 with an air fan 71. Some of these ports are in wall 45, when the wall is employed (as shown). The fan 71 is also supplied with additional cool air through an inlet 73 to cool the gases in the event of their being too hot for operation of fan 71. This mixture is sent into a connection 75 for use described below. An advantage of premixing by the use of excess air, as described, is that an amount of gas is presented to the kiln cross sectionally as a homogeneous mixture not possible of attainment in any other manner. Also, since the gas is of high specific heat, better cooling of lime and heat recovery are accomplished.

The section C of the calcining zone III may be referred to as a terminal calcining section. The lower end of this section C is established by the introduction through nozzles 78 in ports 77 of additional fuel gas, this being supplied over connections 79. The amount of gas introduced over connections 79 is sufficient that, when added to whatever lean mixture of unburned air and fuel arises from finishing zone IV, there will be produced a rich mixture in the terminal calcining section C. Thus there is insufficient air in section C to burn all of the gas delivered thereto, so that again only a controlled and limited temperature rise occurs in the section C above that in the finishing zone IV. Thus terminal calcining is carried out without damage due to high temperatures applied to whatever finished lime is in this section C.

The upper end of the terminal calcining section C, and the lower end of the main calcining section B are determined by the location of ports 81. Recirculation fan 33 has an outlet 83, branched as shown at 85, for supplying ports 81 with recirculating spent gas 41 from the lower end of the preheating zone II and for supplying additional cool air from the inlet 37. If the optional pipe 29 and connection 43 are used, additional recirculating spent gas will be received from the upper end of the preheating zone II, since the line 43, when used, is connected as shown to the air inlet line 37. Additional air brought to the ports 81 serves to burn a substantial amount of the excess gas remaining in the rich mixture arising from the section C to create higher calcining temperatures in the main calcining section B. The purpose of the introduction of recirculating spent gas through ports 81 is to distribute evenly throughout the section B the hot gas thus produced, thus to minimize hot spots and overburning at the higher temperatures required for calcining, in the case of lime production. It will be noted also that optional connections 89 may be made from the fan connections 85 for carrying air and recirculating spent gases to the ports 77. The air thus introduced at ports 77 aids in limiting the temperature in section C, and the spent gases so introduced serve to distribute the gases in section C for even heating.

It will be understood, as regards the optional connections above mentioned, that they do not change the more important characteristics of the invention, which are, among other things, controllably to limit temperatures in the finishing zone IV and the terminal calcining section C, and to obtain even gas distribution to avoid hot spots. Any or all of ports 77 and 81 may be referred to as second inlet means in the shaft 1.

The lower end of the combustion terminating section A is established by ports 91, which receive air and gas from the fan 71 through the connecting means 75. Thus these ports 91 may be referred to as third inlet means and receive the lean mixture of fuel and air as abstracted by the fan 71 from the ports 67 in the cooling zone V. Nozzles 93 are provided, having connections 95 with pipes 97 which may carry high-pressure fuel gas, compressed air, or a mixture of the two. The gas or air is admitted through the nozzles 93. The lean mixture from connection 75 is also admitted adjacent the nozzles. The leanness of the mixture from line 75 determines how much gas or air, or proportions of the two, will be introduced through the nozzles 93. The object is to obtain sufficient air injected at the ports 91 substantially to complete the combustion of all unburned gases arriving at the combustion terminating section A. The precalcining temperature may, for example, be 1,800° F.

It will be noted from the drawing how the combustion terminating section A in its upper portion overlaps the preheating zone II and in its lower portion overlaps the calcining zone III. It will be understood that the upper level of the calcining zone III is somewhat variable. In the upper region of section A which overlaps preheating zone II, some surface calcination occurs on the lumps of rocks while their uncalcined cores are being preheated. In the region of section A that overlaps the calcining zone, calcination proceeds actively in the cores of the lumps, preheating of the stone having been substantially completed.

Summarizing operation, it is as follows, assuming that the shaft 1 has been charged initially with broken rock, for example limestone, and that steady operating conditions prevail:

Rock in the storage zone I is slightly heated by small amounts of spent gases rising above pipe 19. The pressurizing fan 13, the inlet connection 15 of which withdraws gas from between the storage rock pieces, is used to pressurize the charging bunker 5 and its chute 9 when the bell 7 is closed. As above made clear, pressurization prevents induction of air into the shaft 1.

Rock in the preheating zone II is subject to heating from hot products of combustion (spent gases) drawn by fan 27 from the combustion terminating section A.

The recirculation fan 33 handles an amount of this spent gas from outlet 31 for recirculation and is used for bringing about the more even distribution of the fuel throughout the kiln sections, as well as to limit the temperature as above described. The purpose of the exhaust fan 27 is then to draw spent gases that are not used for recirculation through the upper portion of the preheating zone for initial preheating. Final and higher-temperature preheating occurs in the lower end of the preheating zone II. The outlet 31 may be referred to as second outlet port means and pipes 19 and 29 as third outlet port means.

The lean mixture of air and gas from the proportioning control device 55 enters the lower portion of the cooling zone V. The proportions are adjusted to be sufficiently lean that the mixture will not ignite under the temperature conditions desired to be maintained in the cooling zone V. Some of this unignited mixture is drawn off by the fan 71, to provide air and some gas for terminal combustion at the lower part of the combustion terminating section A. The remainder of the unignited mixture rises through the cooling zone V and becomes ignited at the lower level of the finishing zone IV. Due to the leanness of the mixture therein, and homogeneous distribution of the fuel gas within the air the temperature in finishing zone IV is held to safe limits to prevent overburning of the substantial amounts of finished lime in zone IV. In the upper level of the finishing zone IV, that is, in the lower level of the section C, in which calcining is terminated, the additional sufficient amount of gas is brought in through ports 77 to make a rich mixture having an excess of gas with respect to air. This again provides a limited temperature in the section C, so as to prevent overburning in that part of the finished product which has accrued in section C. The large amount of gas here introduced contributes to its distribution without aid, or but little aid, from the recirculating gas.

At the lower end of the calcining section B, air is introduced from inlet 37 by fan 33 over lines 39, 83, 85 (along with spent recirculating gas from channel 31) to burn that part of the gas rising from section C for which there was not sufficient air in section C for complete combustion. Thus more complete combustion is obtained in the calcining section B with attendant higher calcining temperatures. Such higher temperatures in this section B are not deleterious because in section B there is no large collection of finished material as in section C, and zones IV and V. However, the recirculating gas introduced at the bottom of section B minimizes the production of damaging localized overly hot calcining spots in the hot section B.

At the lower end of section A is introduced at high velocity the final amount of air desired for creating turbulent conditions for terminal combustion (see connections 75 and 95). The final burning in the combustion terminating section A is with a short flame, or residual or no flame, the descending material here being mostly stone. Thus temperatures in section A are considerably lower than in the calcining section B. In a sense, the lower end of the combustion terminating section A, which overlaps calcining zone III, may be thought of and referred to as a precalcining section. The elective introduction of some gas from connections 95 is for the purpose of obtaining by suitable adjustments a condition in which substantially all of the gaseous fuel is finally burned without excess air and with a heating rate to provide all of the precalcining desired.

In view of the above, it will be seen that by first passing a lean mixture through the cooling zone V, the desired cooling effect is obtained with heat recuperation and of an approach to the finishing zone IV of a well-distributed mixture of gas and air. The leanness of the mixture reaching the finishing zone IV prevents overheating therein. The richness of the mixture in the terminal calcining section C also prevents overheating in that section. Addition of air in section B results in increased combustion at the calcining temperatures required therein. Long-flame radiant burning occurs in this section B with good flame distribution, because of the injection of the recirculating gases. The addition of air in section A obtains the short-flame terminal combustion process useful for precalcining.

In view of the above, it will be seen that the several objects of the invention are achieved and other advantageous results attained.

As various changes could be made in the above constructions without departing from the scope of the invention, it is intended that all matter contained in the above description or shown in the accompanying drawing shall be interpreted as illustrative and not in a limiting sense.

I claim:

1. Calcining apparatus comprising an upright hollow shaft, lime withdrawal means near its lower end, first inlet means near said lower end, means adapted to form and to introduce a lean cool mixture of fuel and air into said first inlet means to cool lime by transferring heat therefrom to warm the mixture without immediate ignition, first outlet port means above said first inlet means, withdrawal means for drawing some of the warm lean mixture from said first outlet port means, the remaining warm lean mixture being adapted to ignite at a first higher temperature in the kiln above said first outlet port means, said first higher temperature being sufficient for lime finishing, second inlet means above said first outlet port means for the introduction of a rich fuel and air mixture adapted to ignite at said first higher temperature to establish a second higher temperature for calcining, a third inlet means above said second inlet means, means connecting said withdrawal means with said third inlet means for introducing some of said warm lean mixture into the shaft and adapted to ignite at said second higher temperature and completing combustion at a third higher temperature for calcining, second outlet port means above the third inlet means for the abstraction of spent gases, and recirculating means connected with said second outlet port means adapted to deliver spent gases to the second inlet means for even distribution of combustion to prevent overheating during calcination.

2. Calcining apparatus according to claim 1, including means adapted to introduce air to said recirculating means thereby to supply such air as may be required at said second inlet means to form said fuel-rich mixture.

3. Calcining apparatus comprising an upright hollow shaft, lime withdrawal means near its lower end, first inlet means near said lower end, means adapted to form and introduce a lean cool mixture of fuel and air into said first inlet means to cool lime by transferring heat therefrom to the mixture, first outlet port means above said first inlet means, withdrawal means for drawing some of the warm lean mixture from said first outlet port means, whereby a lime cooling zone is established, second inlet means above said first outlet port means for the introduction of a rich fuel and air mixture to establish a calcining zone with a finishing zone between it and said cooling zone, the lower end of said finishing zone being established by a sufficient temperature in the shaft below the calcining zone for ignition of the portion of the lean mixture not withdrawn, a third inlet means above said second inlet means, means connecting said withdrawal means with said third inlet means for introducing some of said warm lean mixture into the shaft for substantially completing combustion of the rich mixture at the upper end of said calcining zone, second outlet port means above said first outlet port means, recirculating means adapted to withdraw spent gases from said second outlet port means and delivering it to said second inlet means with said rich mixture, a third outlet port means above said second outlet port means, and exhaust means connected with said third outlet port means adapted to withdraw most of the spent gases from the upper portion of the shaft.

4. Calcining apparatus according to claim 3, including a connection between said third outlet port means and said recirculating means.

5. Calcining apparatus according to claim 3, wherein said shaft is extended above said third outlet port means to form a storage zone.

6. Calcining apparatus according to claim 5, including a rock bunker above the storage zone and means adapted to withdraw gas from said storage zone and to deliver it to said bunker to prevent air induction into the latter.

References Cited in the file of this patent

UNITED STATES PATENTS

| | | |
|---|---|---|
| 2,199,384 | Azbe | May 7, 1940 |
| 2,408,945 | Mohr, et al. | Oct. 8, 1946 |
| 2,670,946 | Royster | Mar. 2, 1954 |
| 2,733,912 | Newcomb et al. | Feb. 7, 1956 |
| 2,742,276 | Azbe | Apr. 17, 1956 |
| 2,933,297 | Erasmus et al. | Apr. 19, 1960 |